(12) United States Patent
Nojiri et al.

(10) Patent No.: US 6,982,568 B2
(45) Date of Patent: Jan. 3, 2006

(54) IMAGE DISPLAY DEVICE HAVING INSPECTION TERMINAL

(75) Inventors: Isao Nojiri, Hyogo (JP); Hiroyuki Murai, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 210 days.

(21) Appl. No.: 10/644,794

(22) Filed: Aug. 21, 2003

(65) Prior Publication Data

US 2004/0174183 A1    Sep. 9, 2004

(30) Foreign Application Priority Data

Mar. 7, 2003    (JP) ............................. 2003-061778

(51) Int. Cl.
*G01R 31/00*    (2006.01)
*G02F 1/345*    (2006.01)

(52) U.S. Cl. ....................................... 324/770; 349/149

(58) Field of Classification Search ................ 324/770, 324/750–765

See application file for complete search history.

(56) References Cited

U.S. PATENT DOCUMENTS

| 2004/0046920 A1 * | 3/2004 | Hayata et al. ............... 349/149 |
| 2005/0093567 A1 * | 5/2005 | Nara et al. .................. 324/770 |

FOREIGN PATENT DOCUMENTS

| JP | 3-20782 | 1/1991 |
| JP | 5-5897 | 1/1993 |
| JP | 10-104647 | 4/1998 |
| JP | 2001-235725 | 8/2001 |
| JP | 2002-098999 | 4/2002 |

* cited by examiner

*Primary Examiner*—Vinh Nguyen
*Assistant Examiner*—Emily Y Chan
(74) *Attorney, Agent, or Firm*—McDermott Will & Emery LLP

(57) ABSTRACT

An LCD module includes: an odd-numbered data terminal for applying an odd-numbered data signal to each odd-numbered set of data lines through a first N-type TFT and a demultiplexer at inspection; an even-numbered data terminal for applying an even-numbered data signal to each even-numbered set of data lines through a second N-type TFT and the demultiplexer at inspection; and a control terminal for applying a control signal to gates of the first and second N-type TFTs at inspection. It is therefore possible to reduce the number of terminals to be used at inspection, thereby achieving a inspection device at low cost.

9 Claims, 13 Drawing Sheets

IMAGE DISPLAY DEVICE HAVING INSPECTION TERMINAL

BACKGROUND OF THE INVENTION

1. Field of the Invention

The present invention relates to an image display device and, more particularly, to an image display device which is formed on an insulation substrate and which is inspected before shipping.

2. Description of the Background Art

Recently, the resolution of a liquid crystal panel has been increased and the number of terminals which connect LCD (liquid crystal display) modules to an FPC (flexible printed circuit board) increases, accordingly. Further, the miniaturization of an LCD module progresses, so that terminal pitch becomes narrower. To inspect the liquid panel, a probe is applied to each terminal. However, as the number of terminal increases and the terminal pitch narrows, the cost of an inspection device increases.

In order to decrease the cost of the inspection device, there is known a method for connecting odd-numbered data lines of the liquid crystal panel to one inspection terminal; connecting even-numbered data lines to the other inspection terminal; inspecting the liquid crystal panel using the two inspection terminals; and then removing the two terminals (see, for example, Japanese Patent Laying-Open No. 5-5897).

If such two inspection terminals are provided to be common to a plurality of liquid crystal panels, it is considered to be possible to further reduce the cost of the inspection device. Nevertheless, only by connecting the odd-numbered data lines of the plurality of liquid crystal panels to one inspection terminal and also connecting the even-numbered data lines to the other inspection terminal, it is impossible to accurately inspect each liquid crystal panel.

SUMMARY OF THE INVENTION

It is therefore a main object of the present invention to provide an image display device capable of accurately performing an inspection at low cost.

An image display device according to the present invention includes: an image display panel including a plurality of pixel display circuits arranged in a plurality of rows and a plurality of columns, a plurality of scan lines provided in correspondence with the plurality of rows, respectively, and a plurality of data lines provided in correspondence with the plurality of columns, respectively; a plurality of transistors having first electrodes connected to the plurality of data lines, respectively, and made nonconductive when the image display panel is in a normal operation; a first inspection terminal connected to second electrodes of the odd-numbered transistors among the plurality of transistors; a second inspection terminal connected to second electrodes of the even-numbered transistors among the plurality of transistors; and a first control terminal connected to gates of the plurality of transistors, and receiving a control signal for controlling the plurality of transistors during at inspection of the image display panel. Thus, an inspection can be performed by connecting the first inspection terminal, the second inspection terminal and the first control terminal to the inspection device. Therefore, the number of terminals used for the inspection can be reduced and the cost of the inspection device can be also reduced. In addition, even in the case where a plurality of first inspection terminals of a plurality of image display devices are connected to one another and, also, a plurality of second inspection terminals thereof are connected to one another, it is possible to accurately inspect the image display devices one by one.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
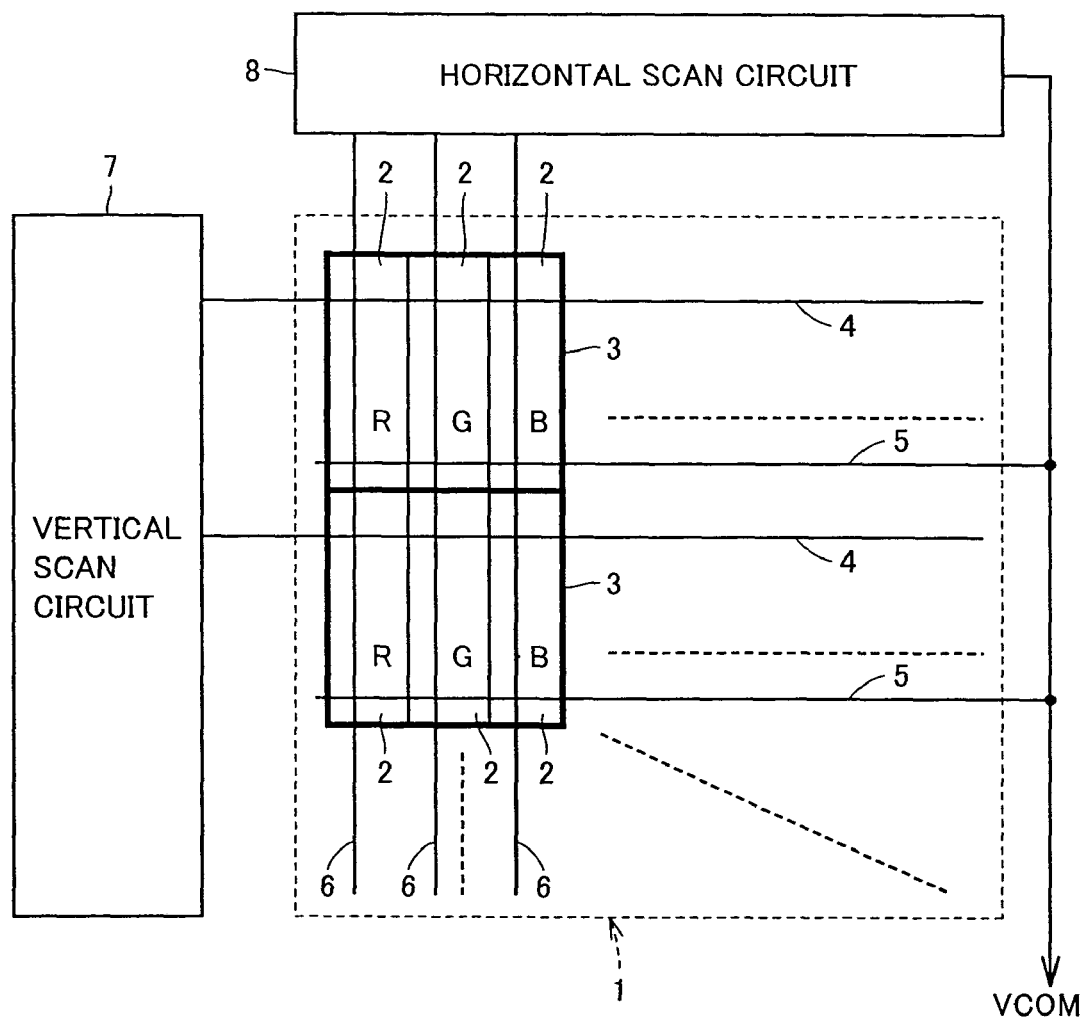
FIG. 1 is a block diagram showing the configuration of a color liquid crystal display device according to a first embodiment of the present invention.

FIG. 1 is a block diagram showing the configuration of a color liquid crystal display device according to a first embodiment of the present invention. In FIG. 1, this color liquid crystal display device includes a liquid crystal panel 1, a vertical scan circuit 7 and a horizontal scan circuit 8. The color liquid crystal display device is provided in, for example, a cellular phone.

Liquid crystal panel 1 includes: a plurality of liquid crystal cells 2 arranged in a plurality of rows and columns; a plurality of scan lines 4 provided in correspondence with the plurality of rows, respectively; a plurality of common potential lines 5 provided in correspondence with the plurality of rows, respectively; and a plurality of data lines 6 provided in correspondence with the plurality of columns, respectively. The plurality of common potential lines 5 are connected to one another.

Liquid crystal cells 2 are divided into a plurality of groups in each row in advance. Each group has three liquid crystal cells 2. Three liquid crystal cells 2 in each group are provided with R, G and B color filters, respectively. Three liquid crystal cells 2 in each group form one pixel 3.

Figure 2:
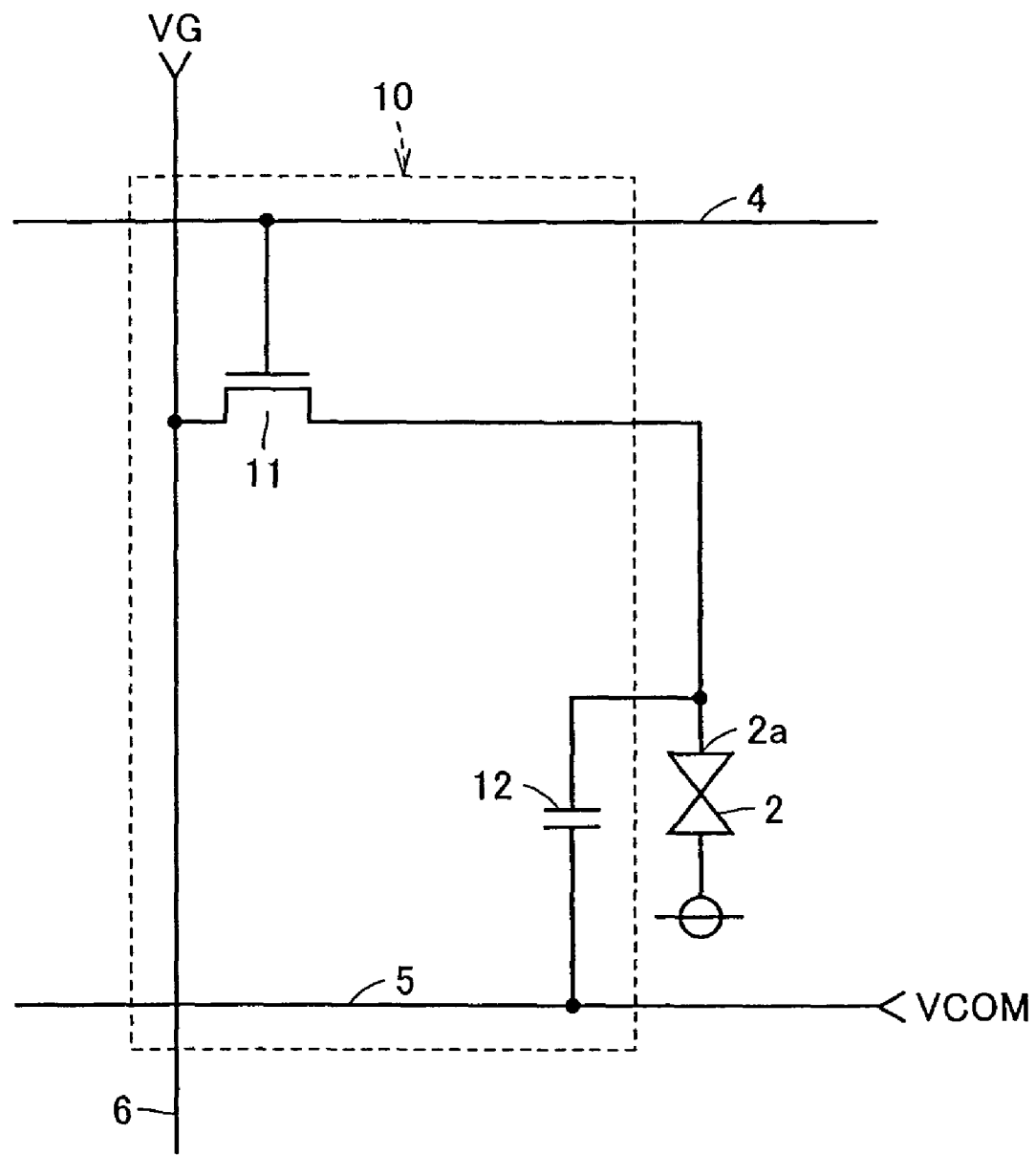
FIG. 2 is a circuit diagram showing the configuration of a liquid crystal driving circuit provided in correspondence with a liquid cell shown in FIG. 1.

As shown in FIG. 2, a liquid crystal driving circuit 10 is provided for each liquid crystal cell 2. Liquid crystal driving circuit 10 includes an N-type TFT (thin film transistor) 11 and a capacitor 12. N-type TFT 11 is connected between data line 6 and one electrode 2a of liquid crystal cell 2, and the gate of N-type TFT 11 is connected to scan line 4. Capacitor 12 is connected between one electrode 2a of liquid crystal cell 2 and common potential line 5. A common potential VCOM is applied to common potential line 5. The other electrode of liquid crystal cell 2 is connected to a counter electrode. The same potential as common potential VCOM is normally applied to the counter electrode.

Referring back to FIG. 1, vertical scan circuit 7 sequentially selects the plurality of scan lines 4 in accordance with an image signal for predetermined time, respectively, and sets selected scan line 4 at "H" level which is selected level. When scan line 4 is set at the selected level of "H", N-type TFT 11 shown in FIG. 2 is made conductive and one electrode 2a of each liquid crystal cell 2 corresponding to selected scan line 4 is coupled to data line 6 corresponding to liquid crystal cell 2.

Horizontal scan circuit 8 applies a gradient potential VG to each data line 6 and common potential VCOM to common potential line 5 while one scan line 4 is selected by vertical scan circuit 7. The light transmittance of liquid crystal cell 2 changes according to the voltage between the electrodes of liquid crystal cell 2.

When all of liquid crystal cells 2 on liquid panel 1 are scanned by vertical scan circuit 7 and horizontal scan circuit 8, one color image is displayed on liquid panel 1.

Figure 3:
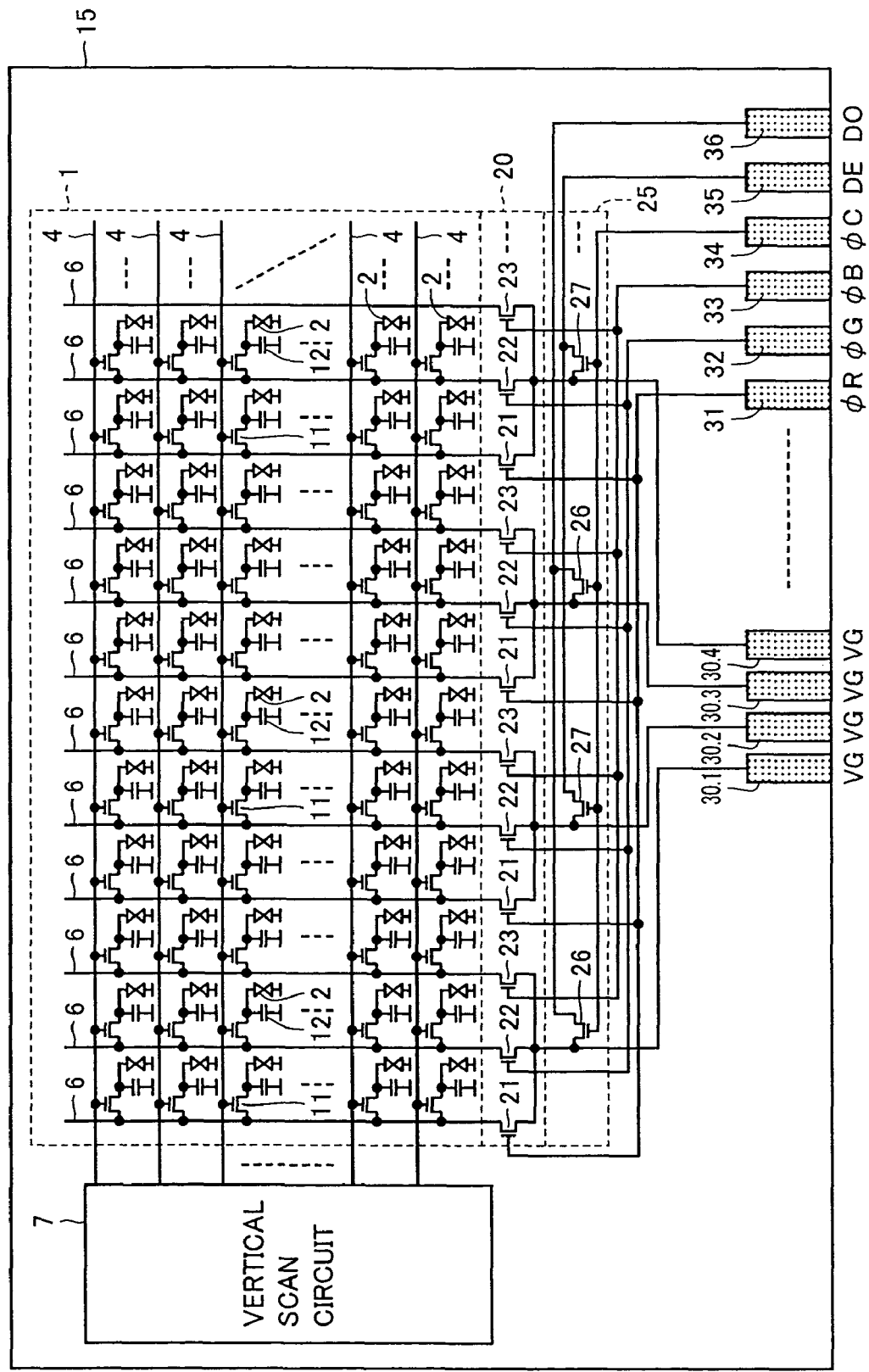
FIG. 3 is a circuit block diagram showing the configuration of an LCD module which is an assembly component of the color liquid crystal display device shown in FIG. 1.

FIG. 3 is a circuit block diagram showing the configuration of an LCD module which is an assembly component of the color liquid crystal display device shown in FIGS. 1 and 2. In FIG. 3, this LCD module includes a glass substrate 15, liquid crystal panel 1, vertical scan circuit 7, a 1:3 demultiplexer 20, an inspection terminal switch circuit 25, a plurality of (e.g., 240) data terminals 30.1 to 30.4, ..., an R terminal 31, a G terminal 32, a B terminal 33, a control terminal 34, an even-numbered data terminal 35 and an odd-numbered data terminal 36 formed on the surface of glass substrate 15.

Terminals 30.1 to 30.4 ... and 31 to 36 are arranged along one side of glass substrate 15 at a predetermined pitch. At inspection, each of terminals 31 to 36 is connected to an inspection device through a probe. After inspection, terminals 30.1 to 30.4 ... and 31 to 36 are connected to an FPC. Gradient potential VG is applied to each of data terminals 30.1 to 30.4 ... from the FPC. A signal φR for selecting R data line 6 is applied to R terminal 31. A signal φG for selecting G data line 6 is applied to G terminal 32. A signal φB for selecting B data line 6 is applied to B terminal 33. A control signal φC is applied to control terminal 34. An even-numbered data signal DE is applied to even-numbered data terminal 35. An odd-numbered data signal DO is applied to odd-numbered data terminal 36.

1:3 demultiplexer 20 includes 240 sets of N-type TFTs 21 to 23 provided in correspondence with 240 sets of R data lines 6, G data lines 6 and B data lines 6 of liquid crystal panel 1, respectively. Each set of N-type TFTs 21 to 23 are connected between one ends of the corresponding set of R data line 6, G data line 6, B data line 6 and corresponding data terminal (e.g., 30.1), and the gates of N-type TFTs 21 to 23 are connected to R terminal 31, G terminal 32 and B terminal 33, respectively.

When signal φR among signals φR, φG and φB is set at "H" level, each N-type TFT 21 is made conductive and each R data line 6 is coupled to the corresponding data terminal. When signal φG among signals φR, φG and φB is set at "H" level, each N-type TFT 22 is made conductive and each G data line 6 is coupled to the corresponding data terminal. When signal φB among signals φR, φG and φB is set at "H" level, each N-type TFT 23 is made conductive and each B data line 6 is coupled to the corresponding data terminal.

Inspection terminal switch circuit 25 includes N-type TFTs 26 provided in correspondence with respective odd-numbered sets among the 240 sets of R data lines 6, G data lines 6 and B data lines 6, and N-type TFTs 27 provided in correspondence with respective odd-numbered sets thereof. Each N-type TFT 26 is connected between the drains of corresponding N-type TFTs 21 to 23 and even-numbered data terminal 36, and the gate thereof is connected to control terminal 34. Each N-type TFT 27 is connected between the drains of the corresponding N-type TFTs 21 to 23 and even-numbered data terminal 35, and the gate thereof is connected to control terminal 34.

When control signal φC is set at "H" level, then N-type TFTs 26 and 27 are made conductive, drains of odd-numbered sets of N-type TFTs 21 to 23 are connected to odd-numbered data terminal 36 and drains of even-numbered sets of N-type TFTs 21 to 23 are connected to even-numbered data terminal 35.

Figure 4:
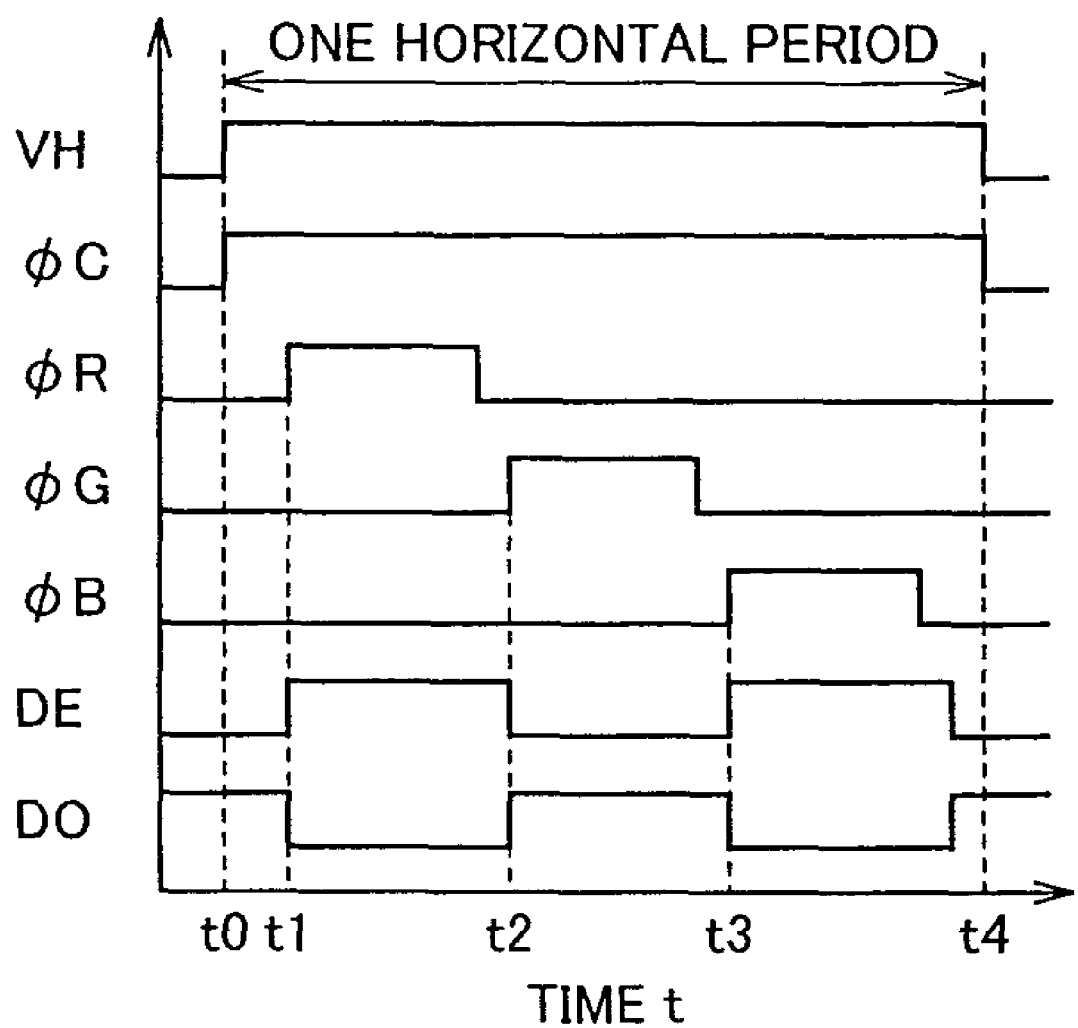
FIG. 4 is a time chart for describing a method for inspecting the LCD module shown in FIG. 3.

FIG. 4 is a time chart showing a method for inspecting the LCD module shown in FIG. 3. At inspection, each of terminals 31 to 36 is connected to the inspection device through the probe. At certain time t0, one of the plurality of scan lines 4 is selected and level of potential VH of selected scan line 4 is raised to "H" level. As a result, N-type TFTs 11 corresponding to selected scan line 4 are made conductive, and each data line 6 is connected to liquid crystal cell 2 through conductive N-type TFT 11. At time t0, the level of control signal φC is raised to "H" level, N-type TFTs 26 and 27 are made conductive, drains of odd-numbered sets of N-type TFTs 21 to 23 are connected to odd-numbered data terminal 36 through N-type TFTs 26, respectively, and drains of even-numbered sets of N-type TFTs 21 to 23 are connected to even-numbered data terminal 35 through N-type TFTs 27, respectively.

Next, at time t1, the level of signal φR is raised to "H" level, each N-type TFT 21 is made conductive, odd-numbered R data lines 6 are connected to odd-numbered data terminal 36 through corresponding N-type TFTs 21 and 26 and, also, even-numbered R data lines 6 are connected to even-numbered data terminal 35 through corresponding N-type TFTs 21 and 27. At time t1, the level of odd-numbered data signal DO is lowered to "L" level, that of even-numbered data signal DE is raised to "H" level, each odd-numbered R data line 6 is set at "L" level, and each even-numbered R data line 6 is set at "H" level. After the passage of predetermined time since time t1, the level of signal φR is lowered to "L" level, each N-type TFT 21 is made nonconductive, and the writing of data signals to respective R liquid cells 2 corresponding to selected scan line 4 is finished.

At time t2, the level of signal φG is raised to "H" level, each N-type TFT 22 is made conductive, odd-numbered G data lines 6 are connected to odd-numbered data terminal 36 through corresponding N-type TFTs 22 and 26, and even-numbered G data lines 6 are connected to even-numbered data terminal 35 through corresponding N-type TFTs 22 and 27. At time t2, the level of odd-numbered data signal DO is raised to "H" level, that of even-numbered data signal DE is lowered to "L" level, each odd-numbered G data line 6 is set at "H" level, and each even-numbered G data line 6 is set at "L" level. After the passage of predetermined time since time t2, the level of signal φG is lowered to "L" level, each N-type TFT 22 is made nonconductive, and the writing of data signals to respective G liquid cells 2 corresponding to selected scan line 4 is finished.

At time t3, the level of signal φB is raised to "H" level, each N-type TFT 23 is made conductive, odd-numbered B data lines 6 are connected to odd-numbered data terminal 36 through corresponding N-type TFTs 23 and 26, and even-numbered B data lines 6 are connected to even-numbered data terminal 35 through corresponding N-type TFTs 23 and 27. At time t3, the level of odd-numbered data signal DO is lowered to "L" level, that of even-numbered data signal DE is raised to "H" level, each odd-numbered B data line 6 is set at "L" level, and each even-numbered B data line 6 is set at "H" level. After the passage of predetermined time since time t3, the level of signal φB is lowered to "L" level, each N-type TFT 23 is made nonconductive, and the writing of data signals to respective B liquid cells 2 corresponding to selected scan line 4 is finished. Next, at time t4, the level of potential VH of each scan line 4 is lowered to "L" level, thus finishing writing of data signals to respective liquid crystal cells 2 corresponding to one scan line 4.

The above operation is performed for each scan line 4, whereby it is possible to write "H" level or "L" level data signals to all of liquid crystal cells 2 on liquid crystal panel 1. It is determined whether or not liquid crystal panel 1 is normal by, for example, detecting the light transmittance of each liquid crystal cell 2. When adjacent two data lines 6 are short-circuited to each other, for example, an intermediate potential between "H" level and "L" level is written to each liquid crystal cell 2 corresponding to data lines 6 and liquid crystal cells 2 show different light transmittances from those of liquid crystal cells 2 corresponding to normal data lines 6. It is therefore possible to easily determine whether or not liquid crystal panel 1 is normal.

Terminals 30.1 to 30.4 . . . and 31 to 36 of the LCD module which is determined to be normal in the inspection are connected to the FPC. The potential of each of terminals 34 to 36 is fixed by the FPC to such a potential (e.g., a ground potential GND) as to make N-type TFTs 26 and 27 nonconductive. The write of gradient potential VG is performed similarly to the writing of data signals DE and DO shown in FIG. 4. That is, from time t1 to t2, R gradient potential VG is applied to each of data terminals 30.1 to 30.4 . . . and R gradient potential VG is written to each R liquid crystal cell 2. From time t2 to t3, G gradient potential VG is applied to each of data terminals 30.1 to 30.4 . . . and G gradient potential VG is written to each G liquid crystal cell 2. From time t3 to t4, B gradient potential VG is applied to each of data terminals 30.1 to 30.4 . . . and B gradient potential VG is written to each B liquid crystal cell 2. In this way, gradient potential VG is written to each liquid crystal cell 2 on liquid panel 1, thus displaying one color image on liquid crystal panel 1.

In the first embodiment, N-type TFTs 26 are connected between drains of odd-numbered sets of N-type TFTs 21 to 23 and odd-numbered data terminal 36, N-type TFTs 27 are connected between drains of even-numbered sets of N-type TFTs 21 to 23 and even-numbered data terminal 35, and gates of N-type TFTs 26 and 27 are connected to control terminal 34, respectively. At inspection, N-type TFTs 26 and 27 are made conductive, inspection data signals DE and DO are applied to terminals 35 and 36, respectively. In a normal operation, N-type TFTs 26 and 27 are fixed into nonconductive states. Therefore, the number of terminals necessary for the inspection can be made small, making it possible to reduce the cost of the inspection device. Further, even when a plurality of odd-numbered data terminals 36 of a plurality of LCD modules are connected to one another and a plurality of even-numbered data terminals 35 thereof are connected to one another, it is possible to individually, accurately inspect the respective LCD modules by controlling the level of control signal φC for each LCD module.

It is noted that liquid crystal panel 1 is formed by forming an array substrate including scan lines 4, data lines 6, N-type TFTs 11 and capacitors 12 in a predetermined region on the surface of glass substrate 15 and then arranging a counter substrate on the surface of the array substrate through liquid crystals. In the first embodiment, the light transmittance of each liquid crystal cell 2 is inspected after the assembling of liquid crystal panel 1. Alternatively, the array substrate may be inspected by monitoring the quantity of electric charges of capacitors 12 before the assembling of liquid crystal panel 1, i.e., before the counter substrate is arranged.

In the first embodiment, inspection terminal switch circuit 25 is formed of N-type TFTs. Alternatively, inspection terminal switch circuit 25 may be formed of P-type TFTs or the parallel connection of N- and P-type TFTs, i.e., a transfer gate.

Figure 5:
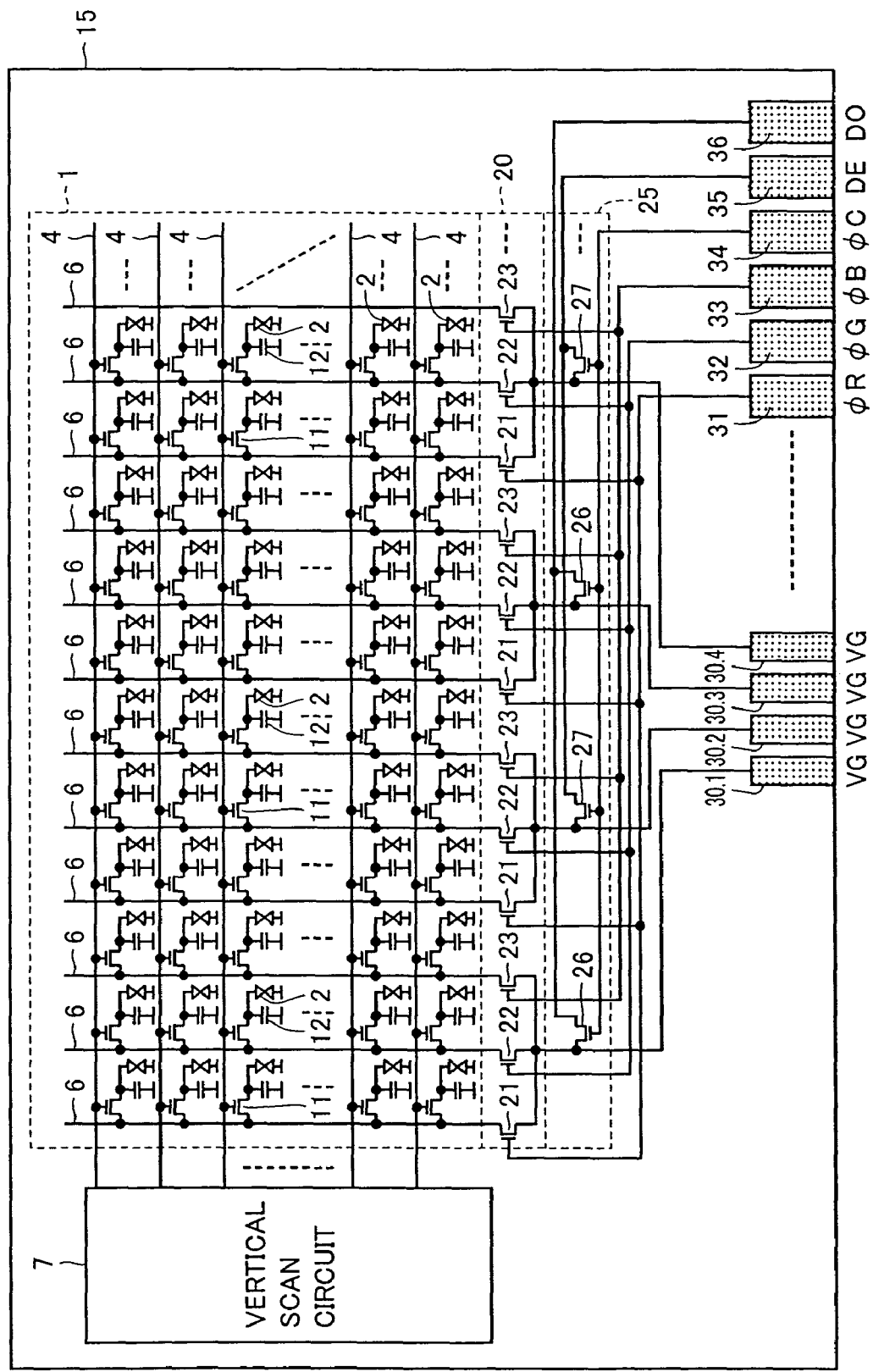
FIG. 5 is a circuit block diagram showing a modification of the first embodiment.

Further, as shown in FIG. 5, it is preferable to set sizes of terminals 31 to 36 used for inspection larger than those of data terminals 30.1 to 30.4 . . . . With this arrangement, it is possible to lower the position accuracy of the probe and to thereby reduce the cost of the inspection device.

Figure 6:
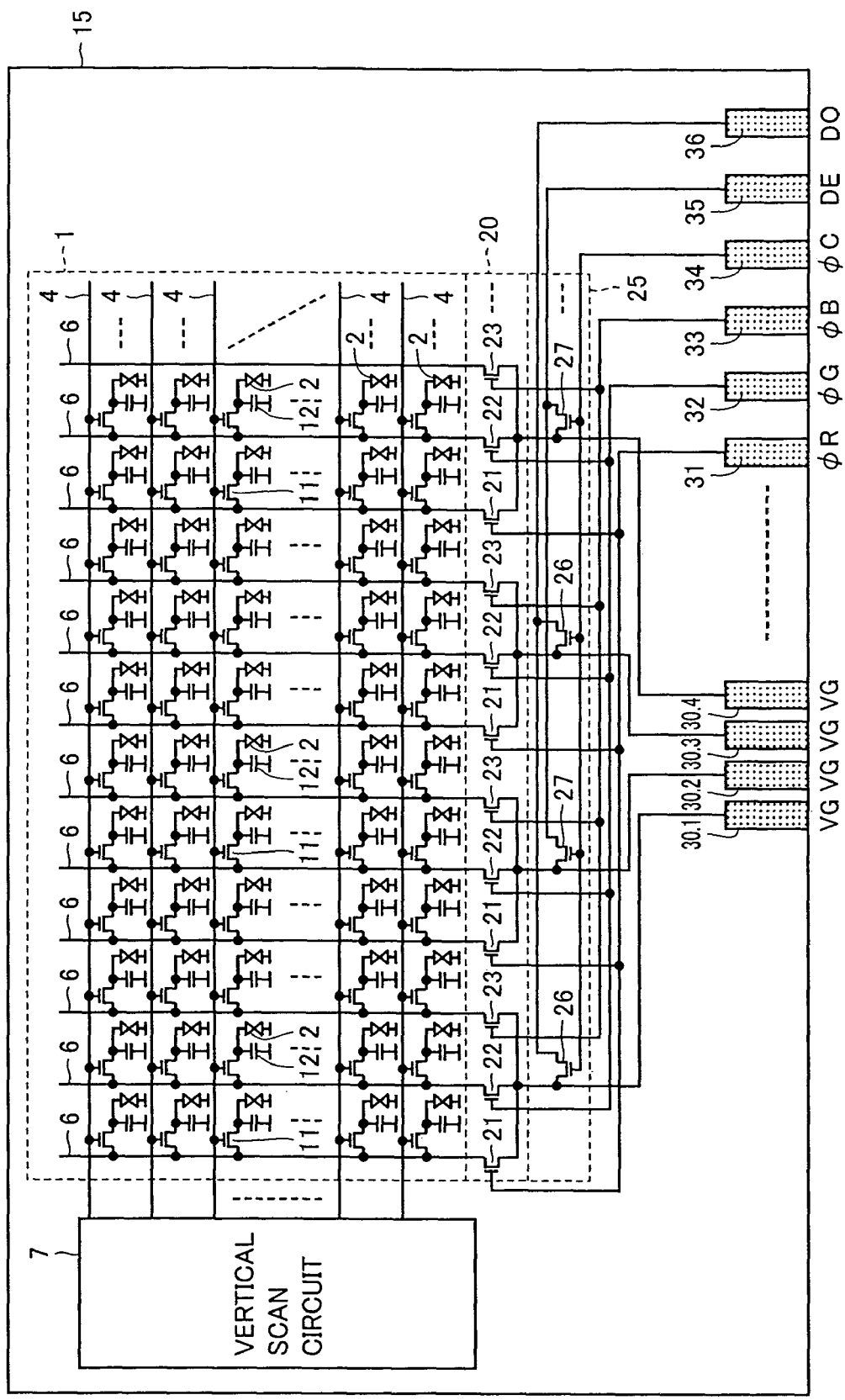
FIG. 6 is a circuit block diagram showing another modification of the first embodiment.

As shown in FIG. 6, it is preferably to set the pitch of terminals 31 to 36 used for inspection wider than that of data terminals 30.1 to 30.4 . . . . With this arrangement, it is also possible to lower the position accuracy of the probe and to thereby reduce the cost of the inspection device. In addition, when the modification shown in FIG. 5 is combined with that shown in FIG. 6, i.e., the sizes and pitch of terminals 31 to 36 used for the inspection are set larger and wider than those of data terminals 30.1 to 30.4, . . . , it is possible to further reduce the cost of the inspection device.

Second Embodiment

Figure 7:
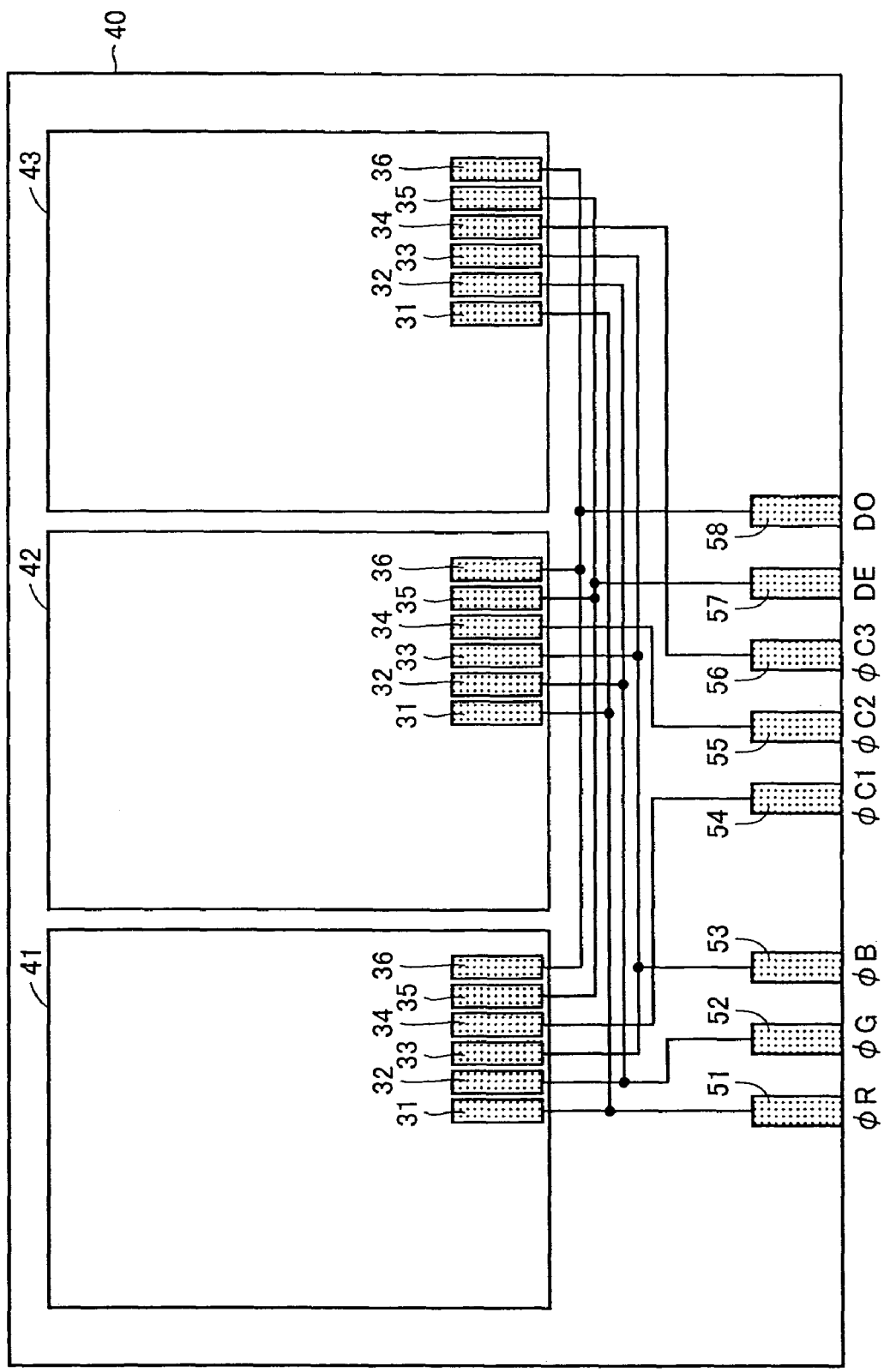
FIG. 7 illustrates a method for inspecting an LCD module according to a second embodiment of the present invention.

FIG. 7 illustrates a method for inspecting an LCD module according to a second embodiment of the present invention. In FIG. 7, a plurality of (three in FIG. 7) LCD modules 41 to 43 are formed on the surface of a glass substrate 40 for inspection method in the second embodiment. Each of LCD modules 41 to 43 is equal in configuration to that shown in FIG. 3. Terminals 31 to 36 used when inspecting each of LCD modules 41 to 43 are arranged to be opposed to one side of glass substrate 40. In addition, an R terminal 51, a G terminal 52, a B terminal 53, control terminals 54 to 56, an even-numbered data terminal 57 and an odd-numbered data terminal 58 are arranged along the one side of glass substrate 40.

R terminals 31 of LCD modules 41 to 43 are all connected to R terminal 51. G terminals 32 of LCD modules 41 to 43 are all connected to G terminal 52. B terminals 33 of LCD modules 41 to 43 are all connected to B terminal 53. Control terminals 34 of LCD modules 41 to 43 are all connected to control terminals 54 to 56. Even-numbered data terminals 35 of LCD modules 41 to 43 are all connected to even-numbered data terminal 57. Odd-numbered data terminals 36 of LCD modules 41 to 43 are all connected to odd-numbered data terminal 58.

At inspection, each of terminals 51 to 58 is connected to the inspection device through a probe. Signals φR, φG, φB, φC1, φC2, φC3, DE and DO are applied to terminals 51 to 58, respectively. In the case of inspecting each of LCD modules 41 to 43, control signals φC1 to φC3 are set at "H" level. Each of LCD modules 41 to 43 is inspected by the same method as that in the first embodiment. After the inspection is finished, each of LCD modules 41 to 43 is cut out from glass substrate 40. At this moment, each of LCD modules 41 to 43 is separated from terminals 51 to 58 and wirings which become unnecessary.

In the second embodiment, a plurality of LCD modules 41 to 43 can be inspected by one time probing. Therefore, as compared with a case of inspecting divided LCD modules one by one, the number of times of probing is small and it requires short time to switch over probing. In addition, since the number of times of probing is small, it is possible to decrease the abrasion and bending of the probe and to thereby expand the life of the probe. It is therefore possible to greatly reduce test cost.

In this second embodiment, similarly to the first embodiment, each array substrate may be inspected by monitoring the quantity of electric charges of capacitors 12 before assembling of liquid crystal panel 1.

Third Embodiment

Figure 8:
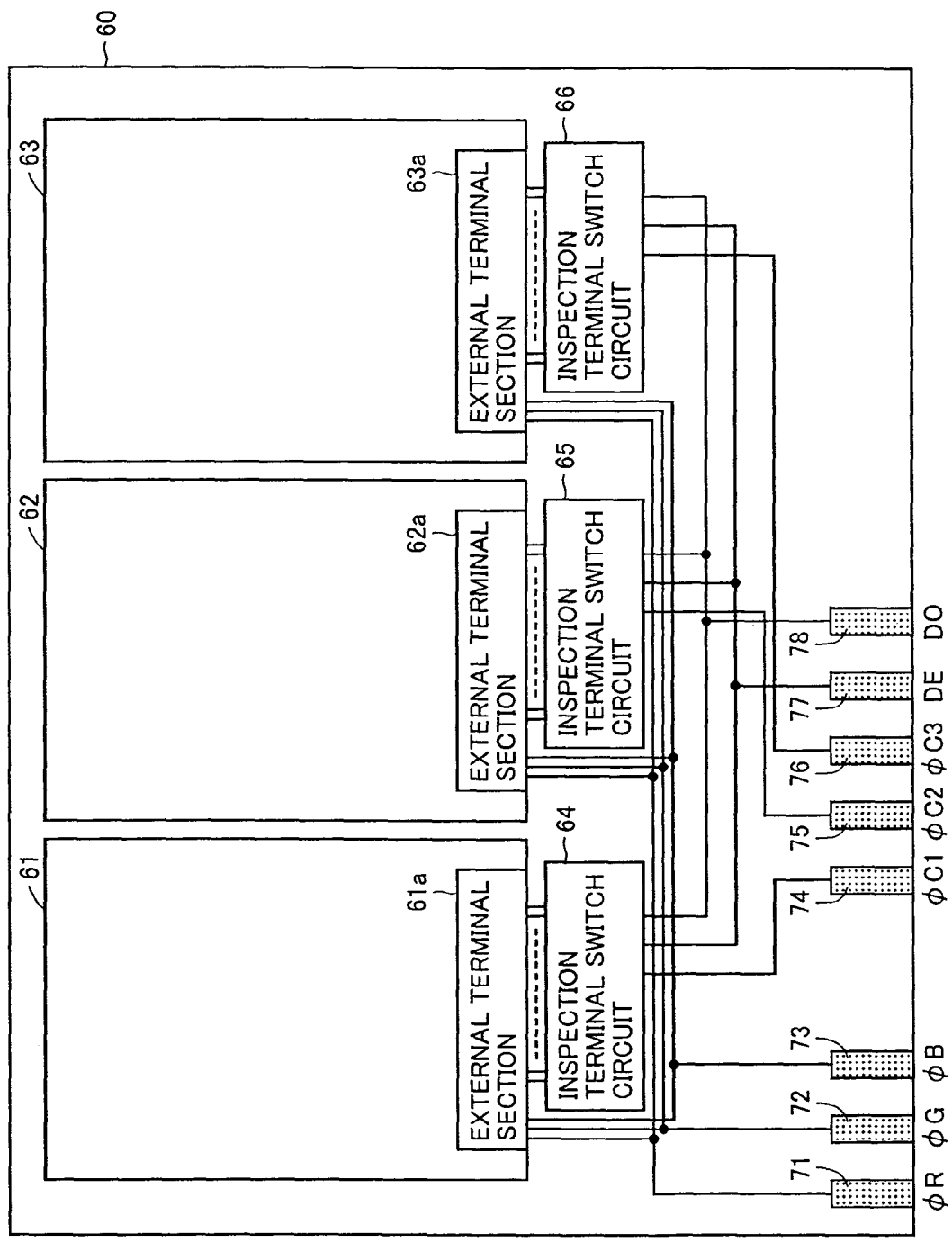
FIG. 8 illustrates a method for inspecting an LCD module according to a third embodiment of the present invention.

FIG. 8 illustrates a method for inspecting an LCD module according to a third embodiment of the present invention. In FIG. 8, a plurality of (three in FIG. 8) LCD modules 61 to 63 are formed on the surface of a glass substrate 60 for the inspection method in the third embodiment. External terminal sections 61a to 63c of LCD modules 61 to 63 are arranged to be opposed to one side of glass substrate 60. Inspection terminal switch circuits 64 to 66 are provided along external terminal sections 61a to 63c of LCD modules 61 to 63, respectively. In addition, an R terminal 71, a G terminal 72, a B terminal 73, control terminals 74 to 76, an even-numbered data terminal 77, and an odd-numbered data terminal 78 are disposed along the one side of glass substrate 60.

Figure 9:
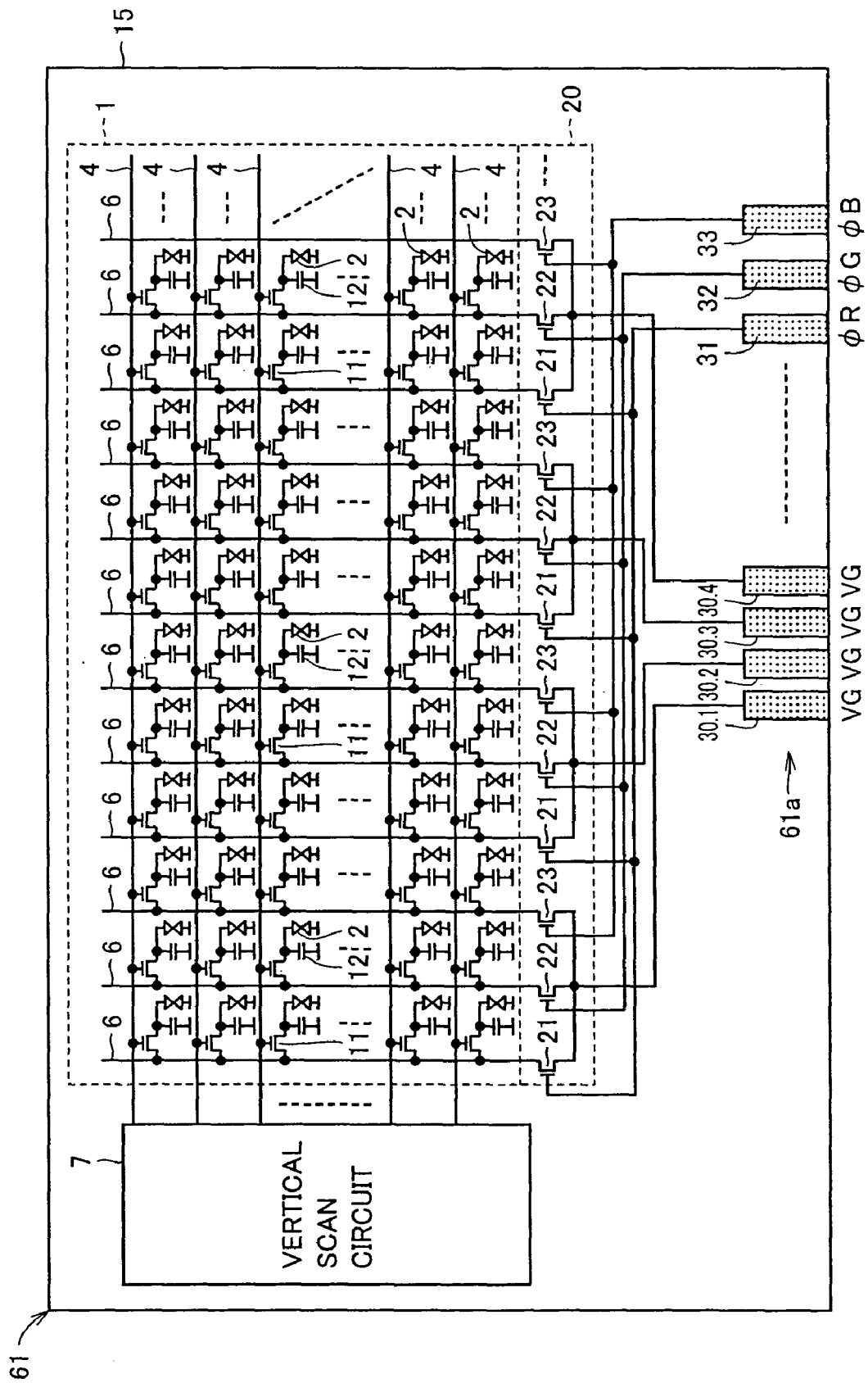
FIG. 9 is a circuit block diagram showing the configuration of the LCD module shown in FIG. 8.

FIG. 9 is a circuit block diagram showing the configuration of LCD module 61. FIG. 9 is given to be compared with FIG. 3. Referring to FIG. 9, LCD module 61 differs from LCD module shown in FIG. 3 in that inspection terminal switch circuit 25, control terminal 34, even-numbered data terminal 35 and odd-numbered data terminal 36 are eliminated. External terminal section 61a includes data terminals 30.1 to 30.4, R terminal 31, G terminal 32 and B terminal 33. Glass substrate 15 forms a part of glass substrate 60. Each of LCD modules 62 and 63 is equal in configuration to LCD module 61.

Figure 10:
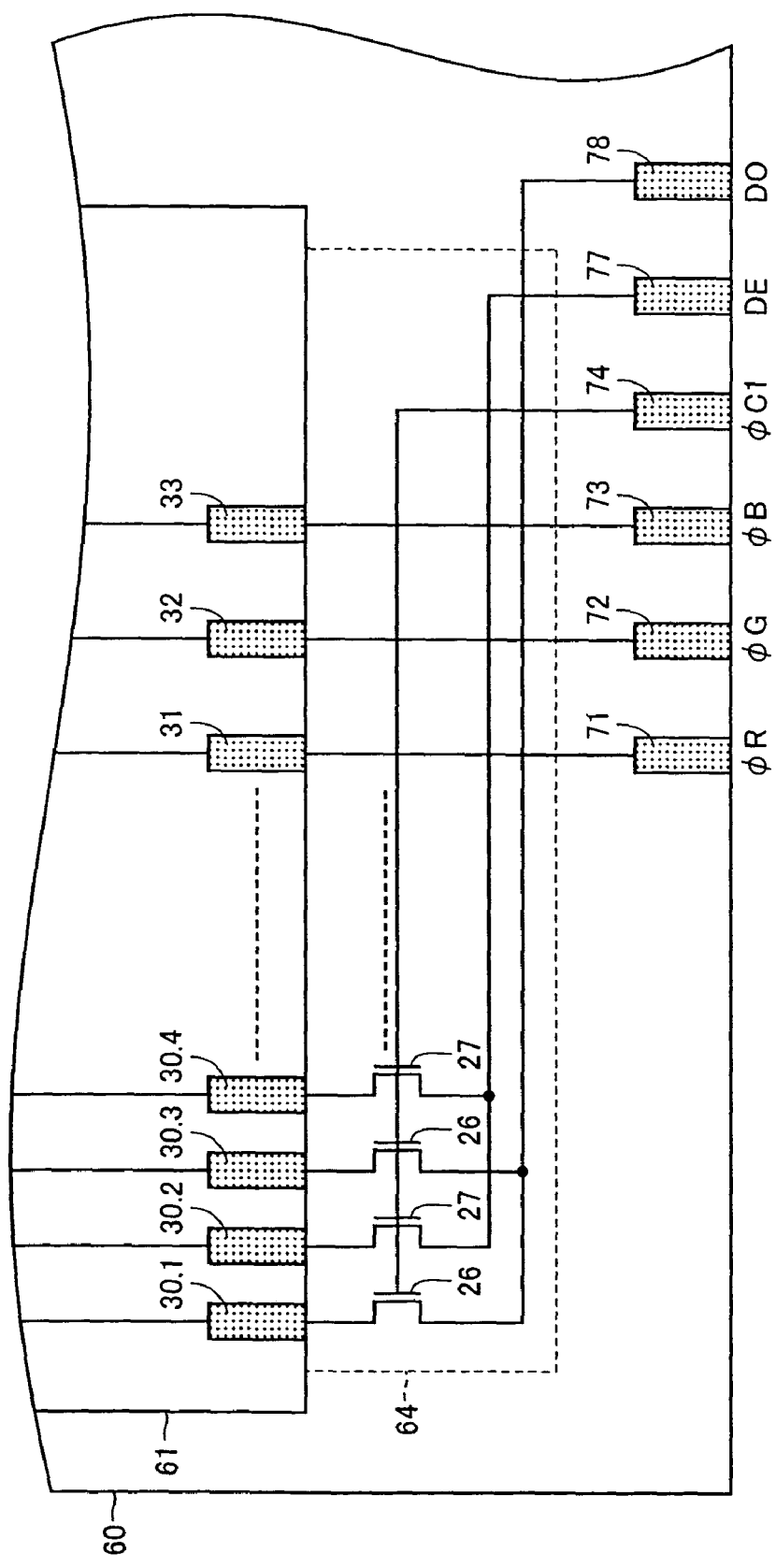
FIG. 10 is a circuit block diagram showing the configuration of an inspection terminal switch circuit shown in FIG. 8.

As shown in FIG. 10, inspection terminal switch circuit 64 includes N-type TFTs 26 provided in correspondence with respective odd-numbered data terminals 30.1, 30.3, ..., and N-type TFTs 27 provided in correspondence with respective even-numbered data terminals 30.2, 30.4, .... Each N-type TFT 26 is connected between the corresponding odd-numbered data terminal and an odd-numbered data terminal 78, and the gate thereof is connected to a control terminal 74. Each N-type TFT 27 is connected between the corresponding even-numbered data terminal and an even-numbered data terminal 77, and the gate thereof is connected to control terminal 74. In FIG. 10, control terminals 75 and 76 are not shown. Inspection terminal switch circuits 65 and 66 are equal in configuration to inspection terminal switch circuit 64. It is noted, however, that gates of N-type TFTs 26 and 27 of inspection terminal switch circuit 65 are connected to control terminal 75 and those of N-type TFTs 26 and 27 of inspection terminal switch circuit 66 are connected to control terminal 76.

At inspection, each of terminals 71 to 78 is connected to the inspection device through a probe. Signals φR, φG, φB, φC1, φC2, φC3, DE and DO are applied to terminals 71 to 78, respectively. In the case of inspecting each of LCD modules 61 to 63, control signals φC1 to φC3 are set at "H" level. Each of LCD modules 61 to 63 is inspected by the same method as that in the first embodiment. After the inspection is finished, each of LCD modules 61 to 63 is cut out from glass substrate 60. At this moment, each of LCD modules 61 to 63 is separated from inspection terminal switch circuits 64 to 66 and terminals 71 to 78 which become unnecessary.

In the third embodiment, the same advantages as those of the second embodiment can be attained. Besides, it becomes unnecessary to fix N-type TFTs 26 and 27 into nonconductive states (to apply ground potential GND to gates and drains of N-type TFTs 26 and 27). Further, the configuration of each LCD module can be simplified.

In this third embodiment, a case where a plurality of LCD modules 61 to 63 are provided on glass substrate 60 has been described. As can be seen from FIG. 10, the inspection method in this embodiment is also effective for a case where one LCD module 61 is provided on glass substrate 60.

Fourth Embodiment

Figure 11:
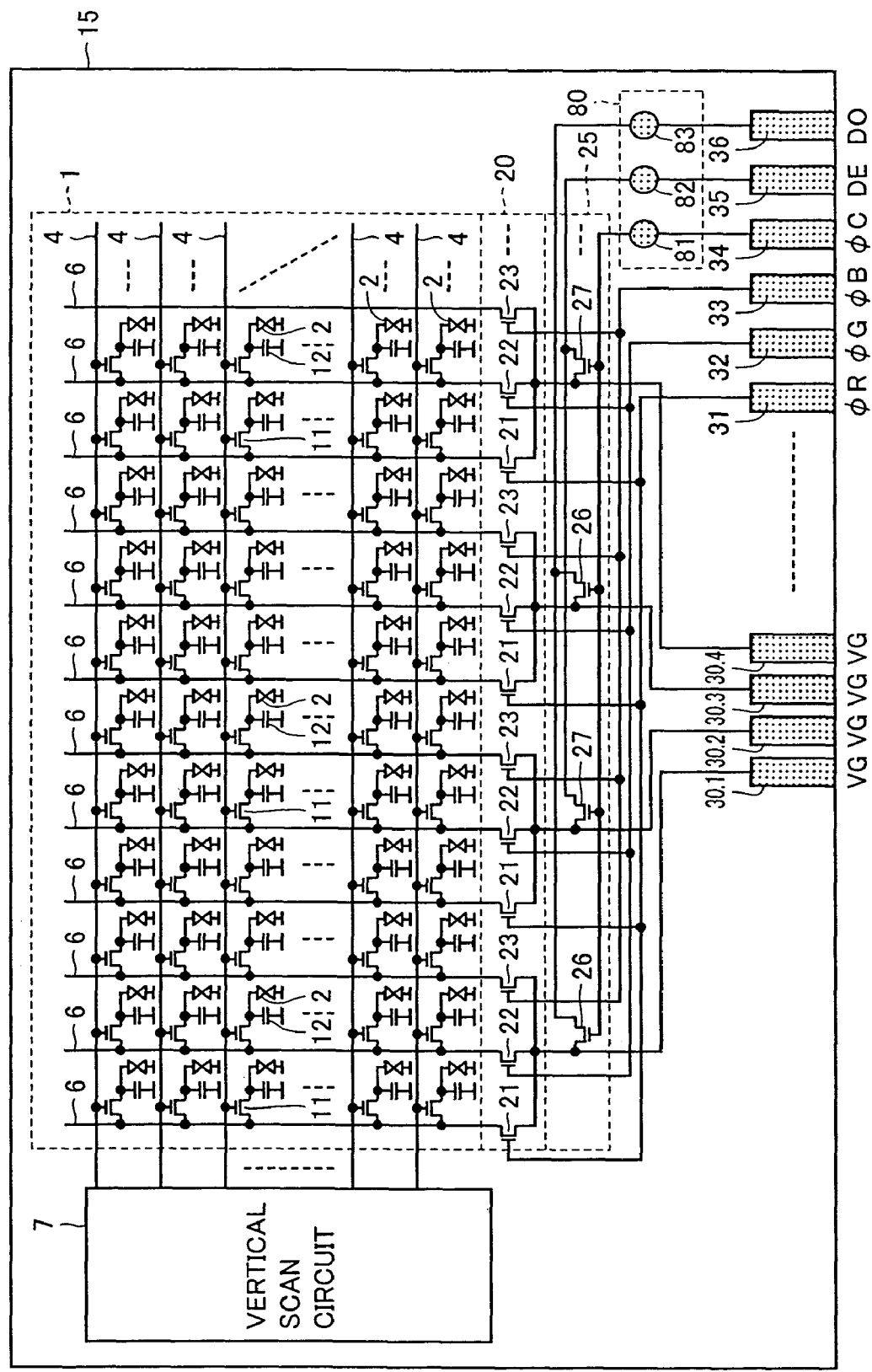
FIG. 11 is a circuit block diagram showing the configuration of an LCD module according to a fourth embodiment of the present invention.

FIG. 11 is a circuit block diagram showing the configuration of an LCD module according to a fourth embodiment of the present invention. FIG. 11 is given to be compared with FIG. 3. Referring to FIG. 11, this LCD module differs from the LCD module shown in FIG. 3 in that three wirings between terminals 34 to 36 and inspection switch circuit 25 pass through a COG (chip on glass) mounting region 80 and pads 81 to 83 are provided at the predetermined positions of the respective three wirings in COG mounting region 80. After an inspection is finished, a semiconductor chip is mounted to cover COG mounting region 80. At this time, the electrode having ground potential of the semiconductor chip is made conductive to three pads 81 to 83, and the potentials of pads 81 to 83 are fixed to ground potential GND. A power supply potential VDD and ground potential GND are applied to the semiconductor chip from a power supply terminal and a ground terminal, not shown, respectively. The semiconductor chip includes a DC-DC converter and the like.

Figure 12:
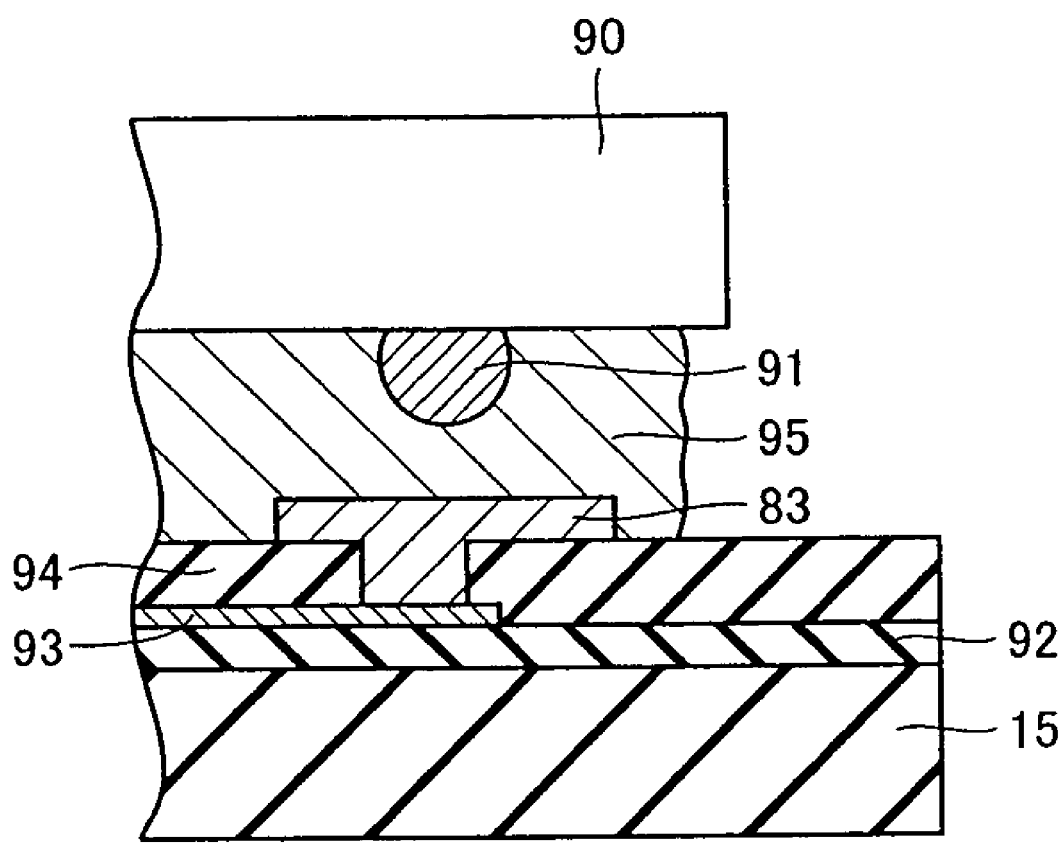
FIG. 12 is a cross-sectional view for describing a method for mounting a semiconductor chip onto the LCD module shown in FIG. 11.

FIG. 12 is a cross-sectional view showing a part of a semiconductor chip 90 mounted on COG mounting region 80. In FIG. 12, an insulation film 92 is formed on the surface of glass substrate 15 and a metal wiring 93 is formed on the surface of insulation film 92. Metal wiring 93 is connected to odd-numbered data terminal 36 and the drain of each N-type TFT 26.

An insulation film 94 is formed to cover metal wiring 93, an opening is formed in a predetermined region of insulation film 94, and a predetermined portion of metal wiring 93 is exposed. Pad 83 which serves as a metal terminal is formed to cover the opening of insulation film 94. An anisotropic conductive resin 95 is applied to the surface of pad 83, and semiconductor chip 90 is mounted so that a bump electrode 91 which serves as the ground terminal of semiconductor chip 90 is located on pad 83. As a result, bump electrode 91 is electrically connected to pad 83.

In the fourth embodiment, semiconductor chip 90 is mounted after the inspection, thereby fixing N-type TFTs 26 and 27 of inspection terminal switch circuit 25 into nonconductive states. This makes it unnecessary to apply ground potential GND to each of terminals 34 to 36 from the outside of the LCD module. It is thereby possible to decrease the number of terminals of the FPC and to narrow the width of the FPC.

Figure 13:
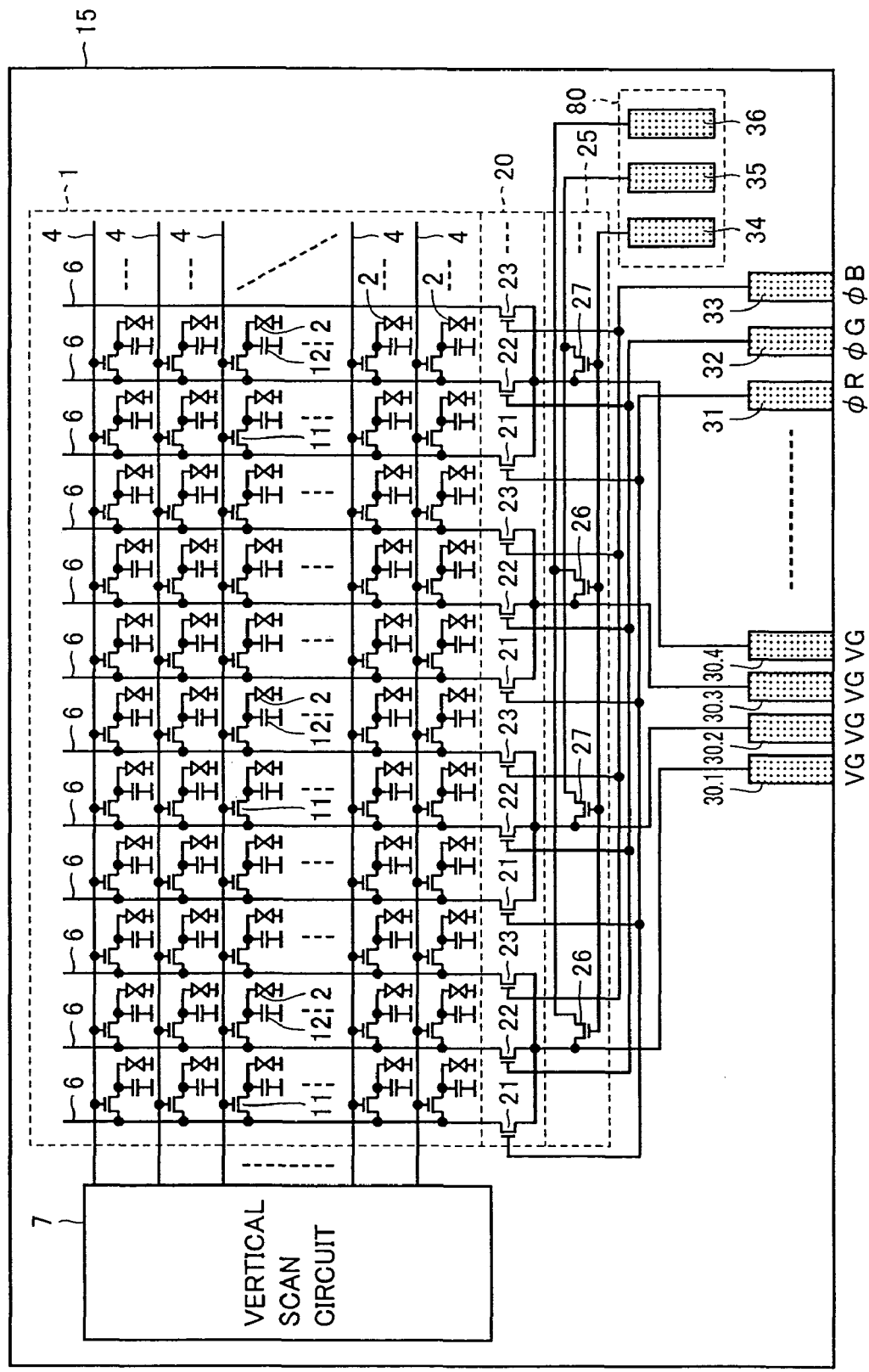
FIG. 13 is a circuit block diagram showing a modification of the fourth embodiment of the present invention.

As shown in FIG. 13, terminals 34 to 36 may be provided in COG mounting region 80. The potential of terminals 34 to 36 are fixed to ground potential GND by the mounting of semiconductor chip 90. In this modification, the same advantages as those of the fourth embodiment can be attained. Besides, it is unnecessary to separately provide pads 81 to 83.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image display device formed on an insulation substrate, comprising:
    an image display panel including a plurality of pixel display circuits arranged in a plurality of rows and a plurality of columns, a plurality of scan lines provided in correspondence with said plurality of rows, respectively, and a plurality of data lines provided in correspondence with said plurality of columns, respectively;
    a plurality of transistors having first electrodes connected to said plurality of data lines, respectively, and made nonconductive when said image display panel is in normal operation;
    a first inspection terminal connected to second electrodes of the odd-numbered transistors among said plurality of transistors;
    a second inspection terminal connected to second electrodes of the even-numbered transistors among said plurality of transistors; and
    a first control terminal connected to gates of said plurality of transistors, and receiving a control signal for controlling said plurality of transistors at inspection of said image display panel.

2. The image display device according to claim 1, further comprising:
    a plurality of data terminals provided in correspondence with said plurality of data lines, respectively, and each receiving a pixel potential for displaying a pixel on said pixel display circuit at said normal operation, wherein
    each of said first inspection terminal, said second inspection terminal and said first control terminal is larger in size than said data terminal.

3. The image display device according to claim 1, further comprising:
    a plurality of data terminals provided in correspondence with said plurality of data lines, respectively, and each receiving a pixel potential for displaying a pixel on said pixel display circuit at said normal operation, wherein
    said plurality of data terminals are arranged at a predetermined pitch, and
    said first inspection terminal, said second inspection terminal and said first control terminal are arranged at a wider pitch than the pitch of said plurality of data terminals.

4. The image display device according to claim 1, wherein each of said first inspection terminal, said second inspection terminal and said first control terminal receives a predetermined potential for making said plurality of transistors nonconductive at said normal operation.

5. The image display device according to claim 4, wherein each of said first inspection terminal, said second inspection terminal and said first control terminal is arranged in a region where a semiconductor chip is mounted after said inspection, and receives said predetermined potential from the semiconductor chip mounted at said normal operation.

6. The image display device according to claim 1, further comprising:
    three pads connected to said first inspection terminal, said second inspection terminal and said first control terminal, respectively, arranged in a region where a semiconductor chip is mounted after said inspection, and receiving a predetermined potential for making said plurality of transistors nonconductive from the mounted semiconductor chip at said normal operation.

7. The image display device according to claim 1, wherein a plurality of module regions are provided on said insulation substrate,
    said image display panel, said plurality of transistors, said first inspection terminal, said second inspection terminal and said first control terminal are formed in each of the module regions,
    said image display device further comprises:
    a first common terminal formed outside said plurality of module regions, and connected to each said first inspection terminal;
    a second common terminal formed outside said plurality of module regions, and connected to each said second inspection terminal; and
    a second control terminal provided in correspondence with each said first control terminal, and formed outside said plurality of module regions, said second control terminal receiving a control signal and applying the control signal to the corresponding first control terminal at said normal operation, and
    each of the module regions is separated from said first common terminal, said second common terminal and each said second control terminal after said inspection.

8. The image display device according to claim 1, wherein a plurality of module regions are provided on said insulation substrate,
    said image display panel is formed in each of the module regions,
    said plurality of transistors and said first control terminal are provided in correspondence with each of the image display panels, and formed outside said plurality of module regions,
    said first and second inspection terminals are provided to be common to said plurality of image display panels, and formed outside said plurality of module regions, and
    each of the module regions is separated from a plurality of sets of said plurality of transistors, each said first control terminal, said first inspection terminal and said second inspection terminal after said inspection.

9. The image display device according to claim 1, wherein said image display panel is separated from said plurality of transistors, said first inspection terminal, said second inspection terminal and said first control terminal after said inspection.

* * * * *